(12) United States Patent
Bank et al.

(10) Patent No.: US 8,132,154 B2
(45) Date of Patent: Mar. 6, 2012

(54) DISPLAYING COMMENT STATISTICS INFORMATION

(75) Inventors: Judith H. Bank, Morrisville, NC (US); Lisa M. W. Bradley, Cary, NC (US); Belinda Y. Chang, Cary, NC (US); Tamera L. Davis, Raleigh, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 11/867,173

(22) Filed: Oct. 4, 2007

(65) Prior Publication Data

US 2009/0094580 A1    Apr. 9, 2009

(51) Int. Cl.
*G06F 9/44* (2006.01)
(52) U.S. Cl. ....................................... 717/123
(58) Field of Classification Search .................. 717/123
See application file for complete search history.

(56) References Cited

U.S. PATENT DOCUMENTS

| 5,513,305 | A  | * | 4/1996  | Maghbouleh ................. 715/234 |
| 6,208,345 | B1 |   | 3/2001  | Sheard et al. |
| 6,507,855 | B1 |   | 1/2003  | Stern |
| 7,194,679 | B1 |   | 3/2007  | Green |
| 7,334,219 | B2 |   | 2/2008  | Cebula et al. |
| 7,512,618 | B2 | * | 3/2009  | Farchi et al. ........................ 1/1 |
| 7,788,640 | B2 |   | 8/2010  | Grimaldi |
| 2004/0078785 | A1 | * | 4/2004  | Dutt et al. .................... 717/136 |
| 2005/0060692 | A1 | * | 3/2005  | Mansourov ................... 717/141 |
| 2005/0229156 | A1 |   | 10/2005 | Baumann |

OTHER PUBLICATIONS

United States Patent & Trademark Office, "Notice of Allowance" for U.S. Appl. No. 11/738,874, Oct. 3, 2011, pages.

* cited by examiner

*Primary Examiner* — Philip Wang
(74) *Attorney, Agent, or Firm* — Cuenot, Forsythe & Kim, LLC

(57) ABSTRACT

A system, method and program product for statistically analyzing comments in one or more program code listings. A system is disclosed that includes a process for associating comments to blocks of code at different programmatic levels in a code listing; a process for assigning weights to different code blocks, and a process for generating a statistical analysis at the different programmatic levels of the comments in the code listing.

17 Claims, 2 Drawing Sheets

```
/*
 * Summary: Determine order of attacks, and process each battle
 * Parameters: Creature object representing attacker
 *           | Creature object representing defender
 * Return: Boolean indicating successful fight
 */ function beginBattle(attacker, defender) {
        var isAlive;        // Boolean inidicating life or death after attack
        var teamCount;      // Loop counter // Check for pre-emptive strike
        if(defender.agility > attacker.agility) {
                isAlive = defender.attack(attacker);
        }

// Continue original attack if still alive
        if(isAlive) {
                isAlive = attacker.attack(defender);
        }

// See if any of the defenders teammates wish to counter attack
        for(teamCount = 0; teamCount < defender.team.length; i++) {
                var teammate = defender.team[teamCount];
        if(teammate.counterAttack = 1) {
                        isAlive = teammate.attack(attacker);
                }
        }

// TODO: Process the logic that handles attacker or defender deaths return true;

} // End beginBattle
```

Figure 2

DISPLAYING COMMENT STATISTICS INFORMATION

FIELD OF THE INVENTION

This disclosure relates generally to providing comment statistic information in program code listings and more particularly to a system and method of providing weighted comment statistic information at different levels and scopes.

BACKGROUND OF THE INVENTION

When creating software, writing code alone is insufficient to enable other programmers to quickly understand the purpose and function of that code. Proper form dictates that there should be some non-functional text along with the code that describes various aspects of its intended operation. Comments (also known as source documentation or Software Code Documentation) are written text that accompanies lines of code in computer software. Comments explain the function of a line of code or a group of lines of code and how it operates. This documentation is usually embedded within the source code itself so it is readily accessible to anyone who may be reading it.

Often, it is desirable to collect statistics regarding the amount of comments in a software listing in order to, e.g., ascertain how well documented the listing is. Code comment statistics tools generate code comment statistics information based on the number of lines that are comments and the number of lines that are the actual code. However, this approach is not always an accurate measure, as having lots of comments does not necessarily mean all the pieces/blocks of the code are well documented. For example, a user can have a lot of comments for a particular method or a parameter, while the remainder of the code is not commented at all. Accordingly, a need exists for a system and method of collecting code comment statistics that more accurately reflect how well the code is documented.

SUMMARY OF THE INVENTION

The present invention relates to a system, method and program product for analyzing statistics of comments in program code listings. In one embodiment, there is a comment statistics system, comprising: a system for associating comments to blocks of code at different programmatic levels in a code listing; and a system for generating a statistical analysis at the different programmatic levels of the comments in the code listing.

In a second embodiment, there is a computer program product stored on a computer readable medium for analyzing comments in program code listing, comprising: program code for associating comments to blocks of code at different programmatic levels in a code listing; and program code for generating a statistical analysis at the different programmatic levels of the comments in the code listing.

In a third embodiment, there is a method of analyzing comments within a program code listing, comprising: associating comments to blocks of code at different programmatic levels in a code listing; assigning weights to different blocks of code; and generating a statistical analysis at the different programmatic levels of the comments in the code listing, wherein the statistical analysis factors in the weights.

In a fourth embodiment, there is a method for deploying a comment statistics system, comprising: providing a computer infrastructure being operable to: associate comments to blocks of code at different programmatic levels in a code listing; and generate a statistical analysis at the different programmatic levels of the comments in the code listing.

The illustrative aspects of the present invention are designed to solve the problems herein described and other problems not discussed.

BRIEF DESCRIPTION OF THE DRAWINGS

These and other features of this invention will be more readily understood from the following detailed description of the various aspects of the invention taken in conjunction with the accompanying drawings.

FIG. 2 depicts a code listing depicting how comments are associated at different programmatic levels in accordance with an embodiment of the present invention.

Figure 1:
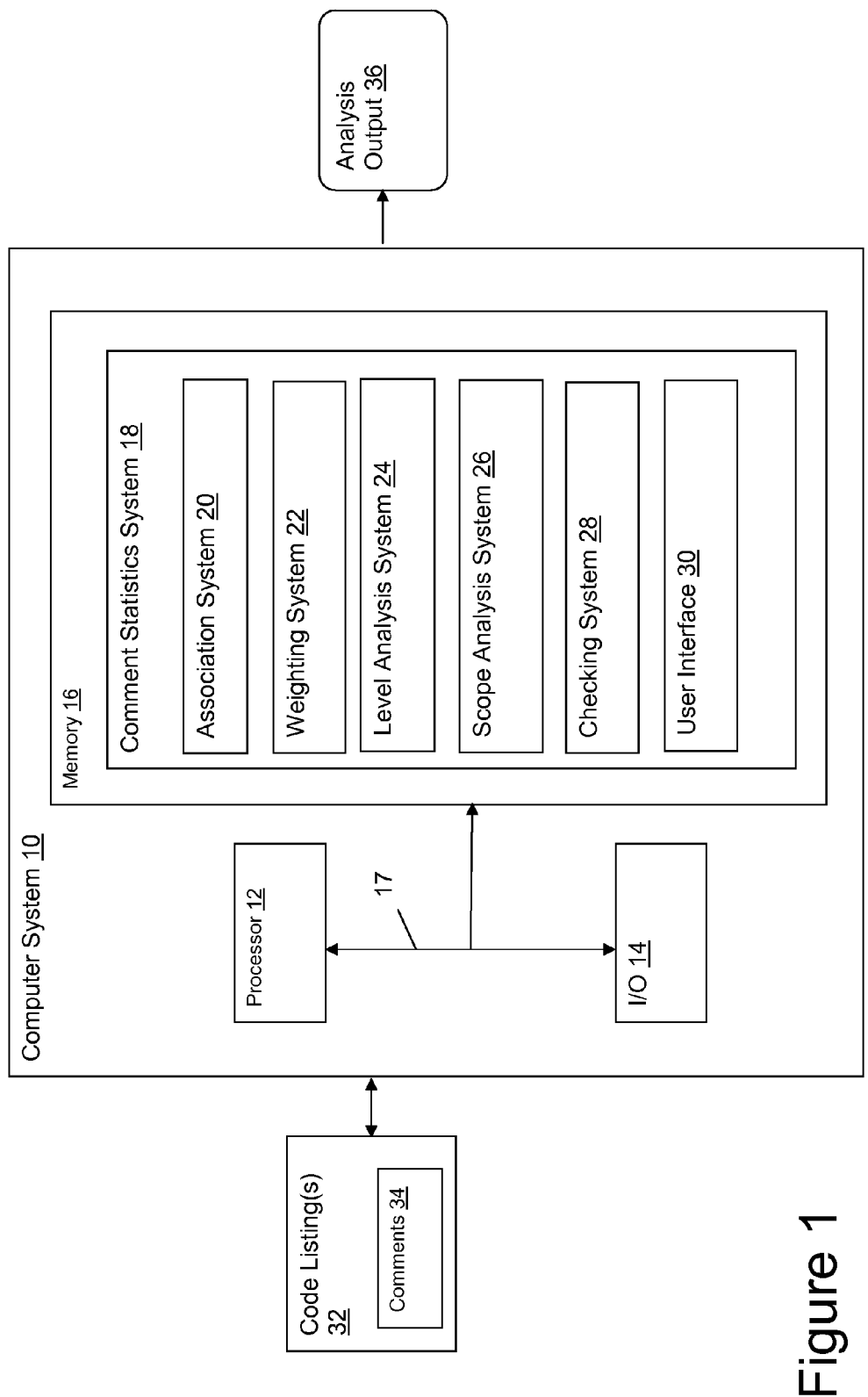
FIG. 1 depicts a computer system having a comment statistics system in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Referring now to the Figures, FIG. 1 depicts a computer system 10 that includes a comment statistics system 18 that analyzes one or more code listings 32 and generates an analysis output 36 of the comments 34 contained in the code listing(s) 32. Comment statistics system 18 includes an association system 20 that associates comments 34 with specific code sections (e.g., lines, blocks, etc.) in the code listing(s) 32; a weighting system 22 that assigns weights to code sections and/or commented and uncommented code sections; a level analysis system 24 that provides statistical analysis at different programmatic levels (e.g., class level, parameter level, main methods level, etc.); a scope analysis system 26 that provides statistical analysis at different file stratums (e.g., a package scope, a file scope, a folder scope, a project scope, etc.); a checking system 28 that can check for the presence/absence of specific types of comments; and a user interface 30 that allows a user to configure, view and interact with the analysis process.

Note that while the illustrative embodiments described herein are generally directed to Java® program listings, it is understood that comment statistics system 18 could be used to analyze any type of program code. For instance, comment statistics system 18 could be used for programming languages (such as C++), script languages (such as JavaScript®), markup languages (such as HTML and XML), workflow languages and other types of procedural languages. Comment statistics system 18 is also suited for implementation in an integrated development environment. An integrated development environment (IDE), also known as integrated design environment and integrated debugging environment, is a type of computer software that assists computer programmers in developing software. (Java and all Java-based trademarks are trademarks of Sun Microsystems, Inc. in the United States, other countries, or both.)

As noted, association system 20 associates comments 34 with specific code sections (e.g., lines, blocks, etc.) in the code listing(s) 32. Association system 20 may be implemented in any fashion. For example, in U.S. patent application Ser. No. 11/738,874, filed on Apr. 23, 2007, entitled "SOFTWARE DOCUMENTATION MANAGER," the contents of which is hereby incorporated by reference, a solution is disclosed in which a user is able to insert association keys (e.g., XML statements) into the code listing to associate comments with particular lines or blocks of code. Nesting of association keys may be utilized to associate comments with different programmatic levels.

Note that there are no limitations to the type and number of levels that may be utilized or defined. In addition, it should be understood that association system 20 could be implemented such that (1) the user manually (e.g., via a user interface) makes the associations between code sections and comments, or (2) the associations are done automatically based on, e.g., the context of the code listing, the location of the comments, etc.

FIG. 2 depicts an illustrative code listing 40. Comments are shown in the code listing 40 as text either appearing between /* and */ or on a line after //. In this case, an initial comment 42 provides a comment that summarizes the function "begin-Battle." Thus, this comment would likely be associated at the function or main methods level. The next set of comments 44 document the variables "isAlive" and "teamCount." Accordingly, these comments would likely be associated at the variable or parameter level. Comments 46 document different operations within the function, and thus would likely be associated at the "inside main methods" level. Comment 48 is essentially a note to the developer indicating work is still to be done on the function, and could likewise be associated at the "inside main methods" level. Finally, comment 50 documents the end of the function, and therefore would likely be associated at the function or main methods level.

Referring again to FIG. 1, weighting system 22 provides a mechanism through which different weights can be applied to different code blocks. Any criteria may be used to assign weights. For example, weights can be assigned based on the number of lines of code in a given block, how often a given block was modified, the context of the code, etc. Thus, for example, blocks of code that require substantial modification, e.g., due to a high number of discovered bugs, can be weighted higher indicating a higher need for documentation to explain the revisions. Similarly, more complicated code blocks, such as those that implement code to interface with other systems, may likewise be weighted higher indicating a heightened need for detailed documentation.

Weighting system 22 may be implemented such that users can select and apply weights to code sections via user interface 30, or via a program that analyzes the code listing(s) 32 and automatically applies weights, e.g., based on size, number of revisions, key words, etc. For example, an automated system may by default weigh public static final variables heavier that private variables.

Level analysis system 24 allows a statistical analysis to be generated at different programmatic levels regarding how thoroughly the code listing(s) 32 is commented. Thus, rather than just reporting that n % of all code lines in a given listing are commented, level analysis system 24 drills the analysis down to different programmatic levels. For instance, in the case of a Java program, a ratio (or percentage) can be generated at the class level, method level, inner class level and parameter level. Namely, for each programmatic level, level analysis system 24 will examine each block (e.g., a line, a section, a routine) at the given level and report a ratio of the number of blocks that are commented versus uncommented. For example, in a program having five methods, level analysis system 24 would ascertain how many of the methods have comments at the method level. Assuming two of the methods had comments at the method level, and no weighting was applied, level analysis would report that 40% ($\frac{2}{5}^{th}$) of the methods were commented.

In a further example, analysis output 36 may report the following information:

| Level | Ratio | Check |
| --- | --- | --- |
| Main Class: | 0% Commented | © info exists |
| Parameters | 30% Commented | n/a |
| Main Methods | 70% Commented | n/a |
| Inside Main Methods | 10% Commented | *** Warning *** |

As seen above, analysis output lists each defined level in a first column, and then a ratio (in this case a percentage of commented blocks) for each level. Accordingly, in this example it can be seen that that 0% of all main classes are commented, 30% of all parameters are commented, 70% of all main methods are commented, and 10% of all "inside main methods" are commented.

In the case where weighting was applied via weighting system 22, the outputted ratio would be dependent upon such weights. For instance, assume the above data was for a Java file having five methods (A, B, C, D, E). Also assume that method A had 60 lines of code, while the other methods B, C, D, E, had 10 lines of code each. In one illustrative weighting configuration, method A would be weighted six times the other, e.g., method A would have a weighted value of 60, while the other four would each have a weighted value of 10. Assume further that methods A and B were commented at the method level, and C, D and E were not commented. A and B would have a combined weight of 70, while C, D and E would have a combined weight of 30. Hence, in this example, the main methods would be considered 70% commented and 30% uncommented.

In the above analysis output 36, there is also a column "check," which is used to display any relevant information determined by checking system 28. For example, in the above case, it can be seen that in the main class copyright information © exists. In addition, it can be seen that inside main methods, a warning was issued because, e.g., the percent commented was low. In some cases, a low percentage of comments may be acceptable, e.g., as long as the main methods were well commented.

Scope analysis system 26 allows the above analysis to be expanded beyond a simple file or program listing, and analyze code at different stratums or scopes, e.g., package scopes, file scopes, folder scopes, project scopes, multiple project scopes, name scopes, routine type scopes, etc. This thus allows code from different listings to be analyzed together. For instance, a development project may include many different files arranged hierarchically in a file system on a storage medium. Scope analysis system 26 allows the analysis of different files to be combined in a single output, e.g., scope analysis system 26 could be directed to analyze all files in a given directory, all files with a similar naming convention, all files created during specified date ranges, etc. Moreover, scope analysis system 26 could likewise analyze portions of different listings, e.g., scope analysis system 26 could be directed to analyze all routines in a set of files that perform floating point arithmetic operations.

User interface 30 provides a mechanism through which a user can configure and interact with the analysis processes described herein. For example, user interface 30 may include a tool that: automatically directs a user to blocks of code that are not well documented; allows the user to define the applicable levels at which level analysis system 24 should be applied; allows the user to set the scope for scope analysis system 26; provides information or rankings regarding code blocks or comments that have been most frequently modified; dictates the format of analysis output 36; determines how weights are to be assigned; sets thresholds or rules within checking system 28; etc.

It is understood that computer system 10 may be implemented as any type of computing infrastructure. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a comment statistics system 18 could be created, maintained and/or deployed by a service provider that offers the functions described herein for customers. That is, a service provider could offer to deploy or provide the ability to analyze comments 34 as described above.

It is understood that in addition to being implemented as a system and method, the features may be provided as a program product stored on a computer-readable medium, which when executed, enables computer system 10 to provide a comment statistics system 18. To this extent, the computer-readable medium may include program code, which implements the processes and systems described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 16 and/or a storage system, and/or as a data signal traveling over a network (e.g., during a wired/wireless electronic distribution of the program product).

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that terms such as "component" and "system" are synonymous as used herein and represent any combination of hardware and/or software capable of performing some function(s).

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical function(s). It should also be noted that the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams can be implemented by special purpose hardware-based systems which perform the specified functions or acts, or combinations of special purpose hardware and computer instructions.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A comment statistics hardware system, comprising:
a processor, wherein the processor is configured to perform
analyzing blocks of code to respectively associate comments, in a code listing, with each block of code;
assigning weights to the blocks of code;
identifying, for each comment respectively associated with a block of code, one of a plurality of different programmatic levels in the code listing; and
generating, for each of the plurality of different programmatic levels, a statistical analysis of the comments in the code listing, wherein
the statistical analysis factors in the weights.

2. The comment statistics system of claim 1, wherein the weights for the blocks of code are generating manually by an end user.

3. The comment statistics system of claim 1, wherein
the weights for the blocks of code are generated automatically.

4. The comment statistics hardware system of claim 1, wherein the processor is further configured to perform
combining statistical analysis for each of a plurality of code listings into a single output.

5. The comment statistics hardware system of claim 4, wherein the processor is further configured to perform
receiving a selection of a scope selected from a group consisting of:
a package scope,
a file scope,
a folder scope,
a project scope,
a multiple project scope,
a name scope, and
a routine type scope.

6. The comment statistics hardware system of claim 1, wherein the processor is further configured to perform
checking, within the comments, different requirements at different programmatic levels.

7. A computer program product comprising a computer readable storage medium having stored therein computer usable program code for analyzing comments in program code listing, the computer usable program code, which when executed by a computer hardware system, causes the computer hardware system to perform:
analyzing blocks of code to respectively associate comments, in a code listing, with each block of code;
assigning weights to the blocks of code;
identifying, for each comment respectively associated with a block of code, one of a plurality of different programmatic levels in the code listing; and
generating, for each of the plurality of different programmatic levels, a statistical analysis of the comments in the code listing, wherein
the statistical analysis factors in the weights.

8. The computer program product of claim 7, wherein
the weights for the blocks of code are generated manually by an end user.

9. The computer program product of claim 7, wherein
the weights for the blocks of code are generated automatically.

10. The computer program product of claim 7, wherein the computer usable program code further causes the computer hardware system to perform
performing the statistical analysis at different programmatic scopes.

11. The computer program product of claim 10, wherein
the programmatic scopes are selected from the group consisting of:
a package scope, a file scope, a folder scope, a project scope, a multiple project scope, a name scope, and a routine type scope.

12. The computer program product of claim 7, wherein the computer usable program code further causes the computer hardware system to perform
checking, within the comments, for different requirements at different programmatic levels.

13. A method of analyzing comments within a program code listing, comprising:
associating comments to blocks of code at different programmatic levels in a code listing;
assigning weights to different blocks of code; and
generating, using a processor, a statistical analysis at the different programmatic levels of the comments in the code listing, wherein
the statistical analysis factors in the weights.

14. The method of claim 13, wherein
the weights are assigned manually to blocks of code by an end user.

15. The method of claim 13, wherein
the weights are assigned automatically.

16. The method of claim 13, wherein
the statistical analysis is performed at a programmatic scope selected from the group consisting of:
a package scope, a file scope, a folder scope, a project scope, a multiple project scope, a name scope, and a routine type scope.

17. The method of claim 13, further comprising
checking for predetermined requirements within the comments at different programmatic levels.

* * * * *